US011684029B2

(12) United States Patent
Larsen

(10) Patent No.: US 11,684,029 B2
(45) Date of Patent: *Jun. 27, 2023

(54) LANDSCAPER INTEGRATION

(71) Applicant: Smart Rain Systems, LLC, Centerville, UT (US)

(72) Inventor: Rudy Lars Larsen, Bountiful, UT (US)

(73) Assignee: Smart Rain Systems, LLC, Centerville, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,095

(22) Filed: Feb. 7, 2022

(65) Prior Publication Data

US 2022/0151169 A1    May 19, 2022

Related U.S. Application Data

(63) Continuation of application No. 15/861,542, filed on Jan. 3, 2018, now Pat. No. 11,240,976.

(51) Int. Cl.
*A01G 25/16* (2006.01)

(52) U.S. Cl.
CPC ........... *A01G 25/16* (2013.01); *A01G 25/165* (2013.01); *G05B 2219/2625* (2013.01)

(58) Field of Classification Search
None
See application file for complete search history.

(56) References Cited

U.S. PATENT DOCUMENTS

| | | |
|---|---|---|
| 5,724,243 A | 3/1998 | Westerlage et al. |
| 5,902,343 A | 5/1999 | Hale et al. |
| 5,987,377 A | 11/1999 | Westerlage et al. |
| 6,298,285 B1 | 10/2001 | Addink et al. |
| 6,453,215 B1 | 9/2002 | Lavoie |
| 6,782,311 B2 | 8/2004 | Barlow |
| 6,823,239 B2 | 11/2004 | Sieminski |
| 7,048,204 B1 | 5/2006 | Addink et al. |
| 7,203,576 B1 | 4/2007 | Wilson et al. |
| 8,396,821 B2 | 3/2013 | Kuhns et al. |
| 8,417,533 B2 | 4/2013 | Clawson |

(Continued)

FOREIGN PATENT DOCUMENTS

WO    2010099348 A1    9/2010

OTHER PUBLICATIONS

Rainbird Corporation, "Commercial Central Control Systems", Brochure, 2012, 8pgs, D40064A, Tucson, AZ.

(Continued)

*Primary Examiner* — Sean Shechtman
(74) *Attorney, Agent, or Firm* — Ray Quinney & Nebeker P.C.; Paul N. Taylor

(57) ABSTRACT

A system and method for providing landscaping integration into a watering system or water management system. The system may include a processor with programmable landscape events or pre-programmed landscape events. A user may select or enter in landscape events to manipulate a watering or irrigation schedule based on the landscape event. The system may also be pre-programmed to a landscape event based on recurring or scheduled events to alter watering or irrigation. A landscaper may access a system on an electronic device that may be linked to a cloud based platform for managing the system or systems to allow for alteration and manipulation of watering and irrigation times and durations based on landscape events.

20 Claims, 7 Drawing Sheets

(56) References Cited

U.S. PATENT DOCUMENTS

| | | |
|---|---|---|
| 8,419,533 B2 | 4/2013 | Clawson et al. |
| 8,565,927 B1 | 10/2013 | Campbell et al. |
| 8,650,069 B2 | 2/2014 | Mason et al. |
| 8,751,052 B1 | 6/2014 | Campbell et al. |
| 8,862,277 B1 | 10/2014 | Campbell et al. |
| 9,307,706 B2 | 4/2016 | Larsen |
| 10,101,753 B1 | 10/2018 | Levine et al. |
| 10,194,598 B2 | 2/2019 | Bauman et al. |
| 10,660,279 B2 | 5/2020 | Larsen |
| 11,240,976 B2 | 2/2022 | Larsen |
| 2003/0093159 A1 | 5/2003 | Sieminski |
| 2003/0130820 A1 | 7/2003 | Lane, III |
| 2004/0030456 A1 | 2/2004 | Barlow et al. |
| 2004/0117154 A1 | 6/2004 | Lane et al. |
| 2004/0117155 A1 | 6/2004 | Lane, III et al. |
| 2005/0216130 A1 | 9/2005 | Clark et al. |
| 2006/0007008 A1 | 1/2006 | Kates |
| 2006/0015269 A1 | 1/2006 | Rigby et al. |
| 2006/0149837 A1 | 7/2006 | Weiner et al. |
| 2006/0235739 A1 | 10/2006 | Levis et al. |
| 2006/0248723 A1 | 11/2006 | Gustafson |
| 2006/0254366 A1 | 11/2006 | Williamson et al. |
| 2007/0043536 A1 | 2/2007 | Tonack et al. |
| 2008/0042883 A1 | 2/2008 | Horstemeyer |
| 2008/0055069 A1 | 3/2008 | Aiki et al. |
| 2009/0063234 A1 | 3/2009 | Refsland et al. |
| 2009/0099701 A1 | 4/2009 | Li et al. |
| 2009/0216345 A1 | 8/2009 | Chrstfort |
| 2009/0271045 A1 | 10/2009 | Savelle et al. |
| 2009/0281672 A1 | 11/2009 | Pourzia |
| 2009/0313077 A1 | 12/2009 | Wheeler, IV |
| 2010/0042263 A1 | 2/2010 | Jacobsen et al. |
| 2010/0100510 A1 | 4/2010 | Balaban et al. |
| 2010/0109861 A1 | 5/2010 | Shah |
| 2010/0250312 A1 | 9/2010 | Tarabzouni et al. |
| 2010/0260325 A1 | 10/2010 | Clawson et al. |
| 2010/0289652 A1 | 11/2010 | Javey et al. |
| 2010/0305764 A1 | 12/2010 | Carr et al. |
| 2011/0040595 A1 | 2/2011 | Chou et al. |
| 2011/0093123 A1 | 4/2011 | Alexanian |
| 2011/0106320 A1 | 5/2011 | Hall |
| 2011/0114202 A1 | 5/2011 | Goseco |
| 2011/0137827 A1 | 6/2011 | Mason et al. |
| 2011/0166714 A1 | 7/2011 | Stachnik |
| 2011/0178644 A1 | 7/2011 | Picton |
| 2011/0195687 A1 | 8/2011 | Das et al. |
| 2011/0238229 A1 | 9/2011 | Woytowitz et al. |
| 2011/0248846 A1 | 10/2011 | Belov et al. |
| 2011/0264282 A1 | 10/2011 | Blank et al. |
| 2011/0298629 A1 | 12/2011 | Wilson |
| 2011/0302995 A1 | 12/2011 | Lebeau et al. |
| 2012/0010758 A1 | 1/2012 | Fanci et al. |
| 2012/0014332 A1 | 1/2012 | Smith et al. |
| 2012/0036091 A1 | 2/2012 | Cook |
| 2012/0072175 A1 | 3/2012 | Hill et al. |
| 2012/0095604 A1 | 4/2012 | Alexanian |
| 2012/0109387 A1 | 5/2012 | Martin et al. |
| 2012/0158192 A1 | 6/2012 | Sherwood |
| 2012/0175425 A1 | 7/2012 | Evers et al. |
| 2012/0210271 A1 | 8/2012 | Clawson |
| 2012/0239211 A1 | 9/2012 | Walker et al. |
| 2012/0254784 A1 | 10/2012 | Vander Griend et al. |
| 2012/0256745 A1 | 10/2012 | Piett et al. |
| 2012/0259540 A1 | 10/2012 | Kishore et al. |
| 2012/0290140 A1 | 11/2012 | Groenveveld |
| 2012/0295576 A1 | 11/2012 | Peterson |
| 2013/0007501 A1 | 1/2013 | Areal et al. |
| 2013/0060389 A1 | 3/2013 | Marsters et al. |
| 2013/0130820 A1 | 5/2013 | Parks |
| 2013/0222133 A1 | 8/2013 | Schultz et al. |
| 2013/0338920 A1 | 12/2013 | Pasken et al. |
| 2014/0005843 A1 | 1/2014 | Thomas |
| 2014/0039696 A1 | 2/2014 | Andrews |
| 2014/0236868 A1 | 8/2014 | Cook |
| 2015/0032272 A1 | 1/2015 | Neesen et al. |
| 2015/0070192 A1 | 3/2015 | Kates |
| 2015/0095090 A1 | 4/2015 | Altieri et al. |
| 2015/0100169 A1 | 4/2015 | Mckinney |
| 2015/0105921 A1 | 4/2015 | Shupe |
| 2015/0120009 A1 | 4/2015 | Killian |
| 2015/0319941 A1 | 11/2015 | Klein et al. |
| 2016/0019560 A1 | 1/2016 | Benkert |
| 2016/0057949 A1 | 3/2016 | Williams et al. |
| 2016/0157446 A1 | 6/2016 | Bentwich |
| 2017/0332566 A1 | 11/2017 | Emory et al. |
| 2019/0159411 A1 | 5/2019 | Gungl et al. |
| 2019/0335689 A1 | 11/2019 | Neesen et al. |
| 2019/0347836 A1 | 11/2019 | Sangireddy et al. |
| 2019/0362444 A1 | 11/2019 | Terrell |

OTHER PUBLICATIONS

Rainbird Corporation, "ESP-LX Modular Controller Installation, Programming, & Operation Guide", User Manual, 2006, 88 pgs, 636281-010 Rev A, Tucson, AZ.

Rainbird Corporation, "IQ LXM-DTC Satelite Controller Installation & User Guide for the IQ Central Control System", User Manual, 2006, 82pgs, P/N 636544-010 Rev A, Tucson, AZ.

Rainbird Corporation, "IQ v2.0 Central Control Software and Software Feature Packs", Tech Spec, 2010, 2pgs, D40031, Tucson, AZ.

Simulation of an Event-Driven Wireless Sensor Network Protocol for Environmental Monitoring. Article. [online]. Maher Ali Al Rantisi, 2014 [retrieved on Jan. 9, 2019].

Smart Watering Systems, "Measure. Manage. Monitor Smart Watering Systems RBC Towers—Bentall Property Mississauga, Ontario 2010", Case Study/Flyer, 2010, 1 pg, Mississauga, Ontario, Canada.

Smart Watering Systems, "Measure. Manage. Monitor Smart Watering Systems Wynford Place—Brookfield Residential Toronto, Ontario 2011", Case Study/Flyer, 2011, 1 pg, Toronto, Ontario, Canada.

Smart Watering Systems, "Measure. Manage. Monitor Smart Watering Systems Yorkdale Mall—Oxford Properties Toronto, Ontario 2009", Case Study/Flyer, 2009, 1 pg, Toronto Ontario, Canada.

FIG. 5

Add Task

Zones affected
[ Select ▼ ]

Start date
[ yyyy-mm-dd ]

Description
[ Try to add few new lines. ]

Reason
[ ▼ ]

Please select reason
New Sod Installation
New Shrub Installation
New Tree Installation
Spring Flower Installation
Fall Flower Installation
Lawn Mowing Service
Granule Fertilization Application
Liquid Fertilization Application
New Seed Estimated cost
[        ]

[ Close ]  [ Add to schedule ]

Add Task

Description — 54

Zones affected [x 01] [x 02] [x 05] [x 13] — 60

02/24/2017 — 56

Estimated Cost — 58

Add to Schedule — 62

Upcoming Costs $0    Spend to Date $0    Budget $0    Site Spend 78%

Preferred Landscaper

Lawn Butler, LLC        Mr. X                      555-555-5555
1234 Street Road      Account Manager   MrX@email.com
City, State 81111

*FIG. 7*

LANDSCAPER INTEGRATION

CROSS-REFERENCE TO RELATED APPLICATION

This application is a continuation of U.S. patent application Ser. No. 15/861,542 filed on Jan. 3, 2018 ("the '542 Application"). The '542 Application is hereby incorporated in its entirety.

TECHNICAL FIELD

This disclosure relates generally to a method of manipulating a watering system, and more specifically to integration of landscaping events into systems and methods for manipulating the watering systems so as to provide ideal conditions for the landscaping event. For example, entering a landscaping event of planting trees in a location and having the watering system turned off for a duration of time and in a specific watering zone to allow a landscaper to plant the trees without the watering system coming on.

BACKGROUND OF RELATED ART

Landscapers often have to go into a system, or multiple systems and manually manipulate controllers in order to manipulate the watering system and watering sequence of a landscape in order to perform a landscape event. If the landscaper doesn't change the system than the landscape owner usually has to change the watering system to change the watering sequence so the landscaper can perform his or her job.

Many businesses and users need water to maintain the grounds of their business facilities and their residences. Some estimates posit that landscape irrigation accounts for nearly one-third of all residential water use, and totals almost nine billion gallons per day. Much of that water is wasted due to inefficient irrigation methods and systems. Likewise the ability to manipulate those systems is very difficult because a user has to go into each controller and change the settings to allow a landscaper to perform an event. Sometimes just the simplicity of mowing a lawn can take unnecessary effort of a landscaper or other user so the lawn can be mowed without it being two wet, or two dry and harming the landscape.

As a result, landscapers, owners and water users are looking for options to easily change the watering sequence to allow for landscape events without negatively impacting their landscape. However, doing so often requires expertise in landscape irrigation and may require expensive equipment. Furthermore, some landscapers, owners and water users are unsure whether they will ever recoup the investment they make in the system. Many landscapers, owners and water users forgo the benefits of more sophisticated irrigation systems and waste water as a result.

BRIEF SUMMARY OF THE INVENTION

Disclosed herein is a method and system for providing a landscaper, or user, the ability to manage and service a landscape by manipulating an irrigation system or watering system. In one embodiment a user will use a computer readable medium and a processor to utilize software to apply changes to a system, more specifically a watering or irrigation system, which may allow a user to input an event that will access the processor to send a signal to the controllers and thus to the irrigation or watering system that will change the manner, nature or sequence of watering dependent on the event entered. These events may include lawn mowing, tree planting, flower planting, tree trimming, landscape changes such as grass planting, flower bed formation and many other landscape events. These events entered into a system may lead to increased or decreased watering times; watering in the mornings, afternoon, evenings or nights; skipping watering times; adding additional watering times.

The method and system may require a computer, tablet, cell phone or other computing device with a processor for carrying out the actions of the entered event (landscape event) and a compatible watering system. The system may be communicated with through Wi-Fi, Ethernet, cellular communication, radio frequency or the like in order for the system and method to function properly. The method and system may include automatic correction and/or customizable correction of watering and irrigation. The system and method may utilize and communicate with weather outlets and forecasters to adequately provide enough water or moisture to the landscaped area along with the event entered by a user or landscaper. The system may manually, automatically or be customized to adjust watering to the weather forecast or the current weather as well.

The system may be maintained on a platform that is either on the cloud, or physically housed in a separate location, or at the location of the watering system. The system may provide notifications to the user or landscaper (as well as the owner of the property) after the event is entered into the system and the signal is provided to the system, through the processor of the computer readable medium based on the landscape event.

The system and method may also involve dynamically adjusting watering system remotely on factors such as forecasted rain, forecasted temperatures, high winds, and other weather-related events that may affect the watering system and facilitate water conservation and not solely based on the landscape event.

Other aspects, as well as features and advantages of various aspects, of the present system and method will become apparent to those of skill in the art though consideration of the ensuing description, the accompanying drawings and the appended claims.

BRIEF DESCRIPTION OF THE DRAWINGS

FIG. 5 illustrates a user interface of FIG. 1, which may include a "pop up", to enter a landscaping task that a user may choose;

FIG. 6 illustrates a sample list of tasks or reasons from a drop down menu for a user to enter into the interface of FIG. 5; and FIG. 7 illustrates is an alternate embodiment of the interface of FIG. 5 for a user to enter a landscaping task or event into a system.

DETAILED DESCRIPTION

Referring in general to the accompanying drawings, various embodiments of the present invention are illustrated to show the system and methods for a watering system. It should be understood that the figures presented are for illustrative purposes only and do not represent actual views of any particular portion of the actual embodiment structure, but are merely schematic representations which are provided to more clearly and fully depict embodiments of the system and method.

The following provides a more detailed description of ways to implement the present system and method and various representative embodiments thereof. In this description, functions may be shown in block diagram form in order not to obscure the present disclosure in unnecessary detail. It will be readily apparent to one of ordinary skill in the art that the present invention may be practiced by numerous other solutions.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Figure 1:
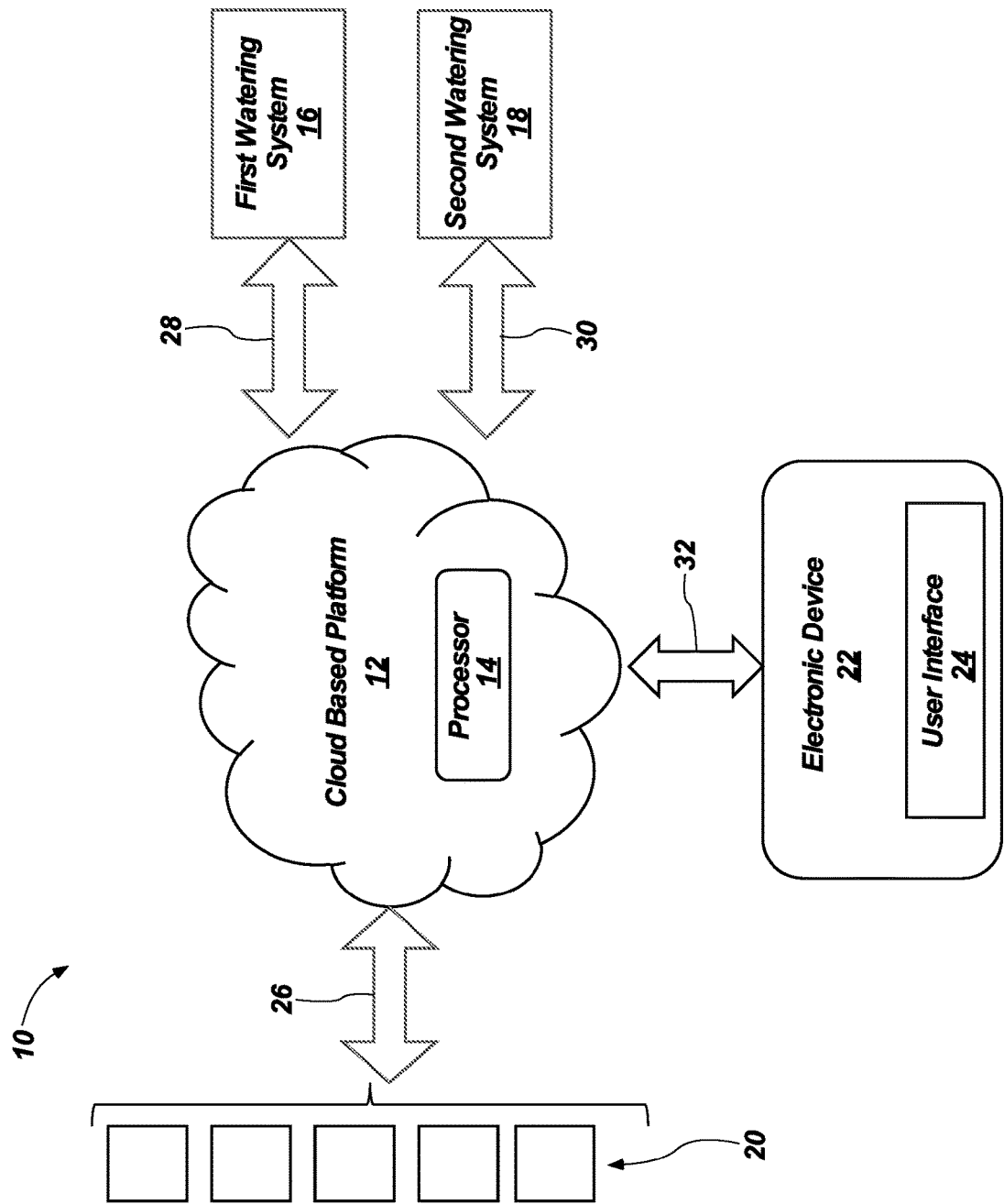
FIG. 1 illustrates a schematic of a watering management system with controllers, zones a processor an electronic device and a user interface.

FIG. 1 illustrates an irrigation or water management system 10, or system) for remotely managing one or a plurality of watering systems. The watering management system 10 includes a cloud based platform 12, or central computer, with a processor 14 in communication with a single or a plurality of individual, remotely located watering systems 16, 18, 20. Each watering system 16, 18, 20 may include a controller for controlling the application of water by the watering system 16, 18, 20 at one or more stations corresponding to a particular portion or area of the watered landscape. Each watering system may be controlled by the owner, leaser, landscaper or other supervisor of the landscape. While each specific watering system may include its own controller each controller receives signals, either wired or wirelessly, from a central computer or cloud based platform 12 processor 14 to perform certain functions via a software interface or user interface 24.

The cloud based platform 12 may be a processor 14 accessible using the Internet or a system accessing the cloud using the Internet. While FIG. 1 illustrates the cloud based platform 12 as a single computing device, in certain embodiments, running software to execute the irrigation of a landscape. The cloud based platform 12 and processor 14 may play host to a plurality of watering systems each with their specific parameters for watering while not requiring a specific cloud based platform or server for each different watering system and access is only granted to those specific users needing access to their property while not having access to other's watering systems. However, it will be appreciated that a plurality of separate computing devices working together may provide the features described herein. In another embodiment, the cloud based platform 12 is a desktop processor running software to implement the methods described herein.

The cloud based platform 12 once accessed may include the user interface 24 that allows users to access one or more functions of the watering system. The user interface 24 may be a graphical user interface (GUI) that runs on the cloud based platform 12 and allows a user to interact with the cloud based platform 12 through an electronic device 22, which may be a computer, tablet, phone or other computing device that may have wired or wireless access to the cloud based platform 12 via a communication link 32. The user interface 24 may also include one or more application programming interface (APIs) that allows one or more computer programs to access the functionality of the processor 14 of the cloud based platform 12.

The cloud based platform 12 may store specific information about each watering system 110, 112, 114. Such information may include specific information about each station in the watering system (e.g., the type(s) of valves, the number and type(s) of sprinkler heads on each station, etc.). In addition, the cloud based platform 12 may store information on the area, topography and type(s) of landscaping covered by each station of the irrigation system 16, 18, 20.

The cloud based platform 12 may also communicate with one or more watering systems 16, 18, 20. The watering systems 16, 18, 20 may include controllers within each watering system 16, 18, 20 the controllers communicating with the watering system 16, 18, 20 itself or the controllers may communicate with the cloud based platform 12 itself. The watering system 16, 18, 20 communicates with the cloud based platform 12 using communications links 26, 28, 30. The communications links 26, 28, 30 may be wired communications links (such as telephone, or Ethernet connections), wireless communications links (such as Wi-Fi, cellular, radio frequency or other), or a combination thereof. The controllers may communicate information with the watering system 16, 18, 20 which then may relay that information to the cloud based platform 12 using an appropriate communications protocol such as TCP/IP. Each controller may communicate water flow information from each station of the watering system 16, 18, 20. In addition, the cloud based platform 12 may be configured to receive information about the amount(s) of non-irrigation water (e.g., precipitation, water from nearby sources, etc.) to which one or more parts of the landscape to which each station of the watering system corresponds is exposed. Such information may be collected in any suitable manner known in the art (e.g., with automated rain sensors, etc.). The information, after gathered, is implemented into the software which executes commands or executes questions for the user to interact with to either automatically or manually adjust the watering system based on the new criteria.

In some embodiments, the cloud based platform 12 may also collect climate information which integrates into the software to execute certain protocols based on the information gathered. The climate information may include weather forecast information (e.g., temperatures at various times of the day, humidity forecast, cloud cover forecast, precipitation forecast, etc.) and/or real-time weather data (e.g., current temperature, current humidity, current cloud cover, current precipitation and up-to-date precipitation levels, etc.). Other types of information may also be stored and/or collected by the cloud based platform 12.

The software in the cloud based platform 12 may also be configured to implement an irrigation management plan that includes irrigation programs for each of the stations in the watering system. The irrigation management plans may be unique to each watering system 16, 18, 20. In other embodiments, the irrigation management plans for like watering systems (i.e., those with similar landscapes) are the same. The software of the cloud based platform 12 may communicate the irrigation management plan to the controllers for each of the irrigation systems 16, 18, 20, which controls then implement the irrigation management plan at the location.

The user may log in to the cloud based platform 12 via any computer, laptop, tablet or smart phone or the like. Logging into the cloud based platform 12 may enable a user to manipulate the settings and change controls of the watering system, enter in an event for the landscape that is preprogrammed into the system to manipulate a watering schedule, which may be an original schedule, a standard schedule or the reversion schedule, to accommodate the landscape event, or implement a new irrigation plan or any other variation. The user, after logging in, may also be able to permit other users to access the watering system(s) on the cloud based platform 12 to allow multiple users the ability to manipulate the watering system.

In addition to including a cloud based platform 12 and a plurality of remote irrigation systems 16, 18, 20, a watering system of the present embodiment may include one or more mobile devices that communicate with the cloud based platform 12. Each mobile device may comprise a portable electronic device of a type known in the art, such as a smart phone, a tablet computer, or the like. The mobile device may access the cloud based platform and display notifications requested by the user regarding each monitored irrigation system 16, 18, 20 from the cloud based platform 12 and, in some embodiments (including embodiments where the cloud based platform 12 automatically controls the monitored watering systems 16, 18, 20 and embodiments where the cloud based platform 12 does not automatically control the monitored watering system 16, 18, 20), to enable remote control over each monitored watering system 16, 18, 20 either through the cloud based platform 12 or directly.

In one embodiment, applications for mobile devices may also be configured to receive reports from the cloud based platform 12 of a landscape event and the adjustments implemented by the system accordingly. For example, the property owner may have a mobile device with an application for receiving reports concerning landscape events and changes in watering schedule from the cloud based platform 12. Where the property owner has multiple properties to manage a single access to the cloud based platform 12 can allow the user to access each location with a single device and single recurring fee. The property owner may be able to consolidate reports, notifications, alerts and the like for the multiple properties.

In another embodiment, the user may be able to enter commands beyond the pre-programmed landscaping events for the entire system or for each specific controller into the application, which commands are sent to each respective system and/or controller. The user may be able to override the irrigation management plan using the application. The user may, for example, cause the controller to perform extra watering for a particular station using the application on the mobile device after a landscape event has prevented the watering of a specific zone. The application may provide for automatic or manual return to previously programmed watering schedules based on the logic feedback by the user or the watering system itself. The cloud based platform 12 may report the completion of landscape events or return of typical watering schedule or an adjustment to a watering schedule based on the landscape event. A user or an irrigation manager, can take such information into account in determining the cost effect of user-directed watering. The cloud based platform 12 may similarly track user-directed watering events that are initiated from a controller. An "irrigation manager" is an individual who may install, service and program the watering system for a user. A "task manager" is an individual in charge of the landscaping event.

For purposes of this disclosure a "landscape event" can be any event involving landscaping, including, but not limited to, new flowers install, tree planting or install, altering the landscape, shrub planting or install, pruning, gardening, weeding, sod or grass seed install, lawn mowing, lawn and other plant service(s).

Figure 2:
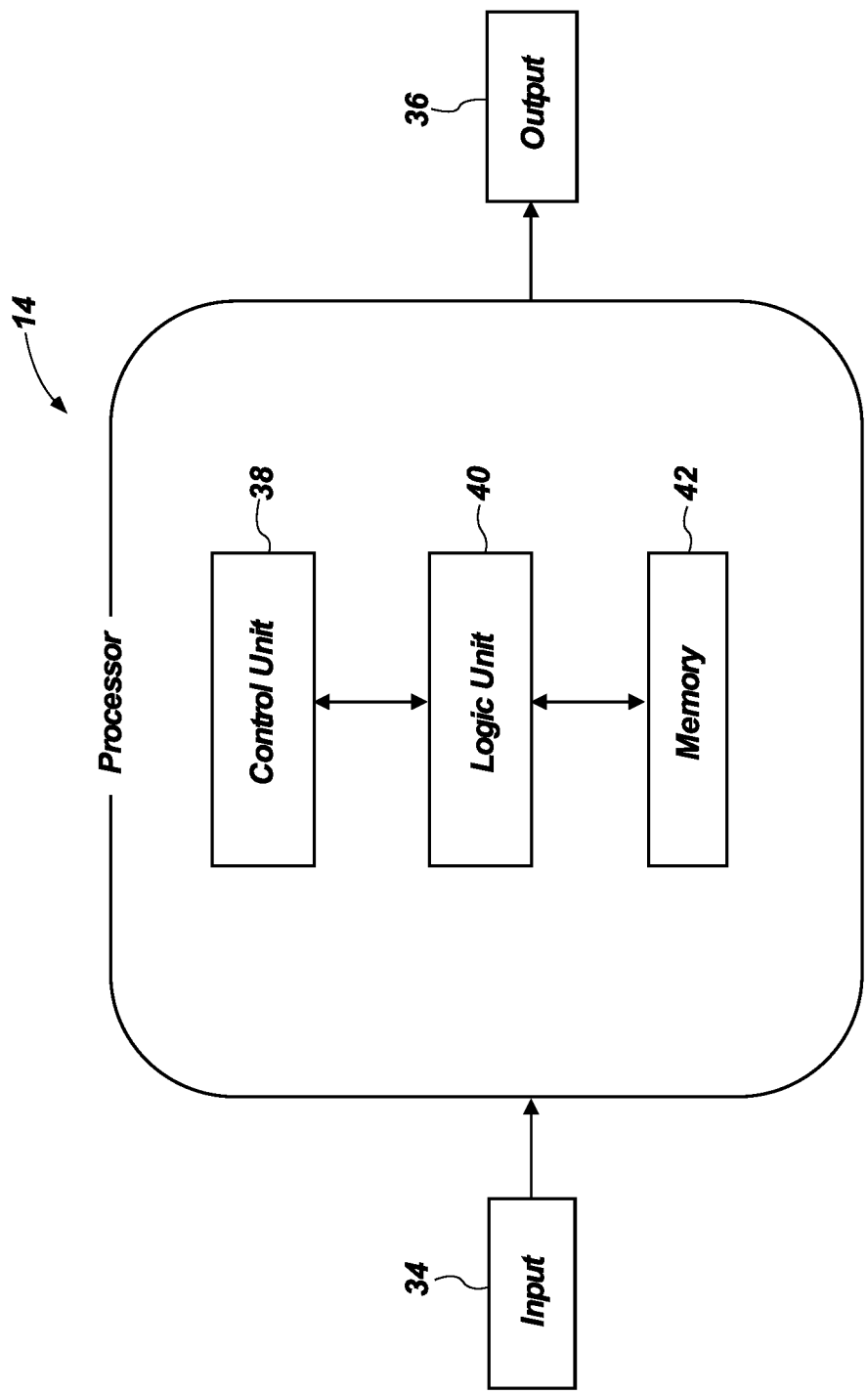
FIG. 2 illustrates a schematic of an embodiment of a processor with an input function, a control unit, memory, a logic unit and an output function.

FIG. 2 illustrates the processor 14 and flow of information to, within and out of the processor 14. An input 34 may flow into the processor and such input may be a plurality of commands that may be pre-programmed or may be programmed directly to input the processor 14. The input 34 may come from a command from a user or from a sensor within the watering system 10. The processor 14 may include memory 42 that maintains pre-programmed information including commands and schedules based on the inputs coming from the user or irrigation manager. The memory 42 may also be able to maintain and store new commands that input new instructions to the processor based on user input. Likewise the processor may "learn" from the inputs from a user to manipulate the programs and pre-programmed material for future interfaces by the user with the processor 14.

The processor 14 utilizes the programs in the memory to go through the logic unit(s) 40 that then signal the control unit 38 to output 36 a command to a controller of the watering management system 10.

Figure 3:
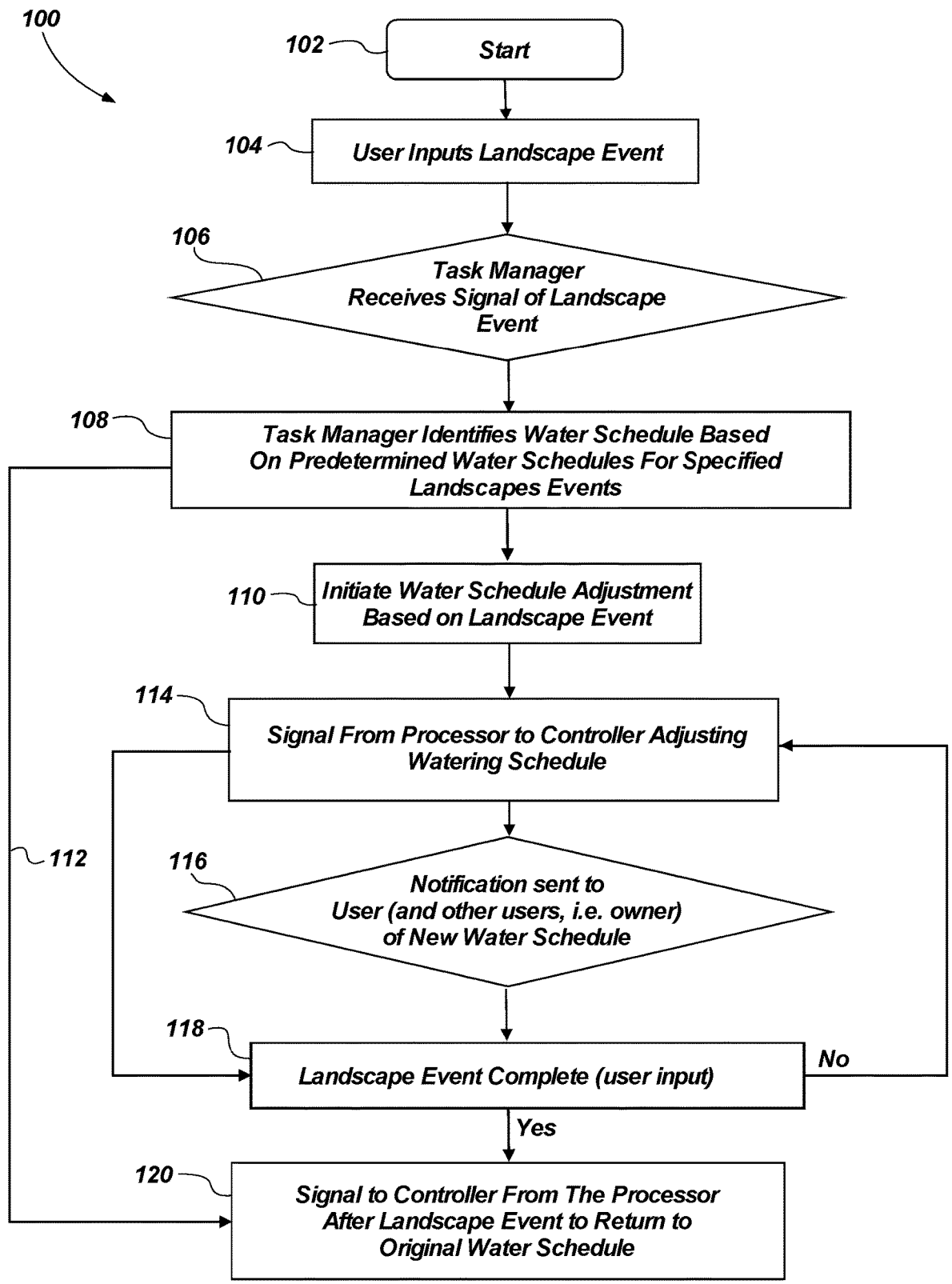
FIG. 3 is a process flow diagram which may be used by the processor of FIG. 2.

FIG. 3 illustrates a possible configuration of logic 100 that may be carried out within the processor to control the watering management system 10 and its setting in response to input 34 from a sensor or a user. The processor 14 may start the logic (102) by receiving an input 34 from a user or sensor, retrieve a pre-programmed landscape event (104) from the memory 42. In the case of a user or sensor input 104 the input may include watering times, specific watering zones, or sprinklers, and watering amounts. A user may be required to input specific information in relation to the event input if not already maintained or stored in the memory 42.

The task manager may receive notification of a landscape event (106) and may manually override the program or pre-programmed schedule or may accept or agree to the landscape event (108). Alternatively, the processor may notify a task manager of a landscape event (106) and then proceed immediately to initiate the watering schedule based on the landscape event (108); or the processor may not notify the task manager and proceed immediately to initiate the water schedule based on the landscape event (110). The landscape event may include a predetermined time to water or not to water a specified landscape area that may signal through the processor for those predetermined times and then result in reversion back to the original schedule after the predetermined scheduled landscape event (112).

Alternatively the landscape event may provide an adjustment in watering that remains (114) and a notification may be sent to the user or task manager of the new schedule (116). The notification being sent to the user (116) is a step which may be utilized once, multiple times or may be skipped entirely. Such new schedule could be a schedule of watering on "off" days, watering at night, or discontinue watering all together. After the landscape event is complete a user may enter the completion (118) into the watering management system 10 that processes through the processor 14 signaling the controllers to return to the normal irrigation schedule (120). Furthermore, a landscaper may be able to input details of the landscape event that took place such as duration, number of man hours, landscape event specifics and even costs.

Figure 4:
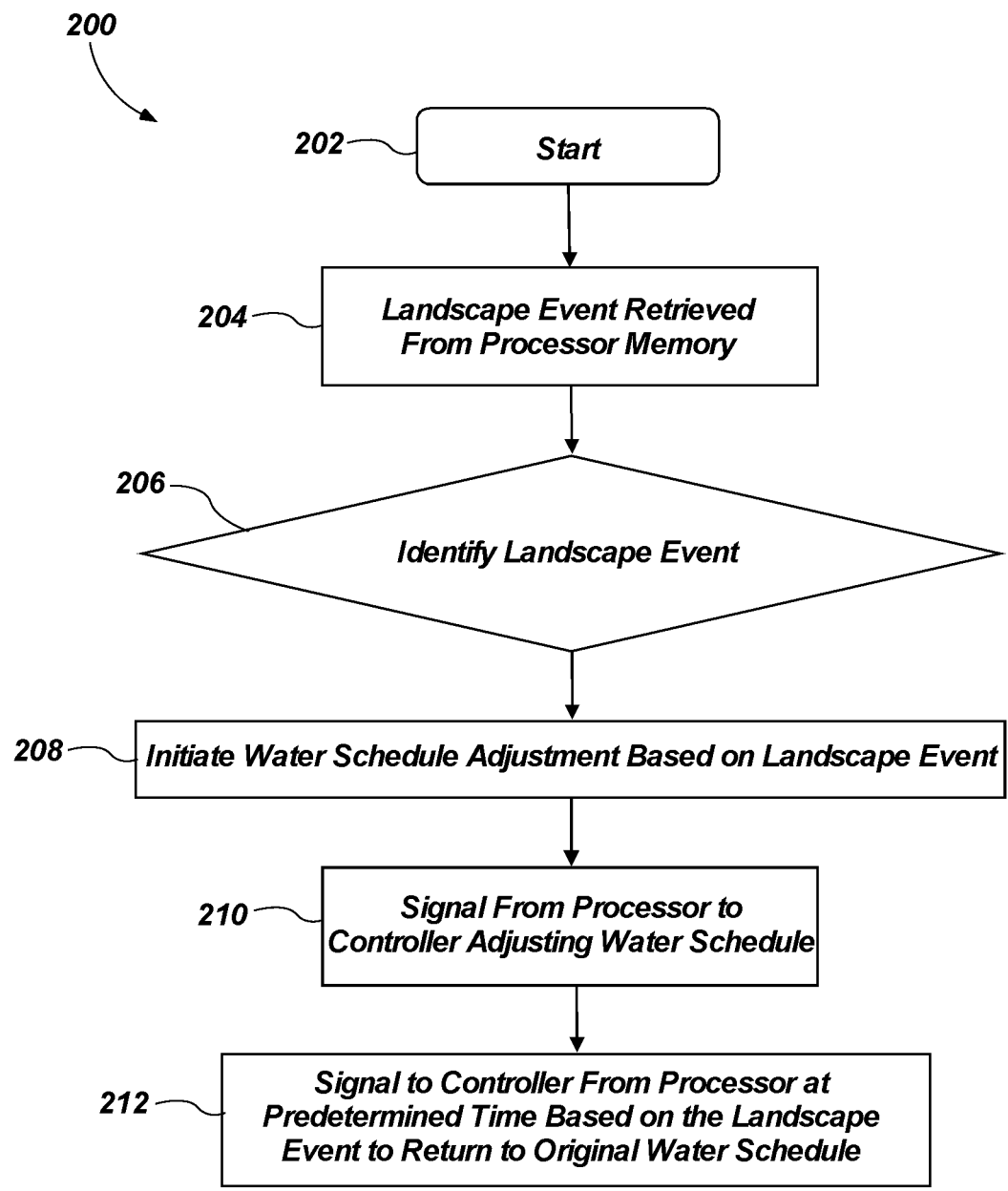
FIG. 4 is an alternative process flow diagram which may be used by the processor of FIG. 2.

Referring to FIG. 4 a separate logic sequence 200 may be carried out within a processor to control the watering management system 10 and its settings. A watering system may be manipulated by a user or landscaper or may be automatic based on predetermined events (200) and may be retrieved from the watering system (202), which includes the user interface 24, or where a drop down tasks menu 44 provides the landscape events that may be stored on the memory 42 of a processor 14 already pre-configured. The access to these landscape events may be on a mobile application or through other electronic means on a tablet, computer or the like. The landscape event is identified from the predetermined events (204) and may be chosen from a list of events 46 (refer to FIG. 6). The processor 14 may initiate an adjustment in the watering schedule (208) and provides an output signal 36 to the controllers of the watering management system 10 to adjust the watering schedule in conjunction with that controller (210). Multiple controllers may be manipulated from a single output signal and each signal may be the same or may be different depending on the location of the controller and each respective zone of that controller. The processor 14 may then send a signal after a predetermined time based on the landscape event to each respective controller to return to the previous watering schedule (212) or in other words, revert to the schedule the watering management system 10 was utilizing prior to the landscape event.

Figure 5:
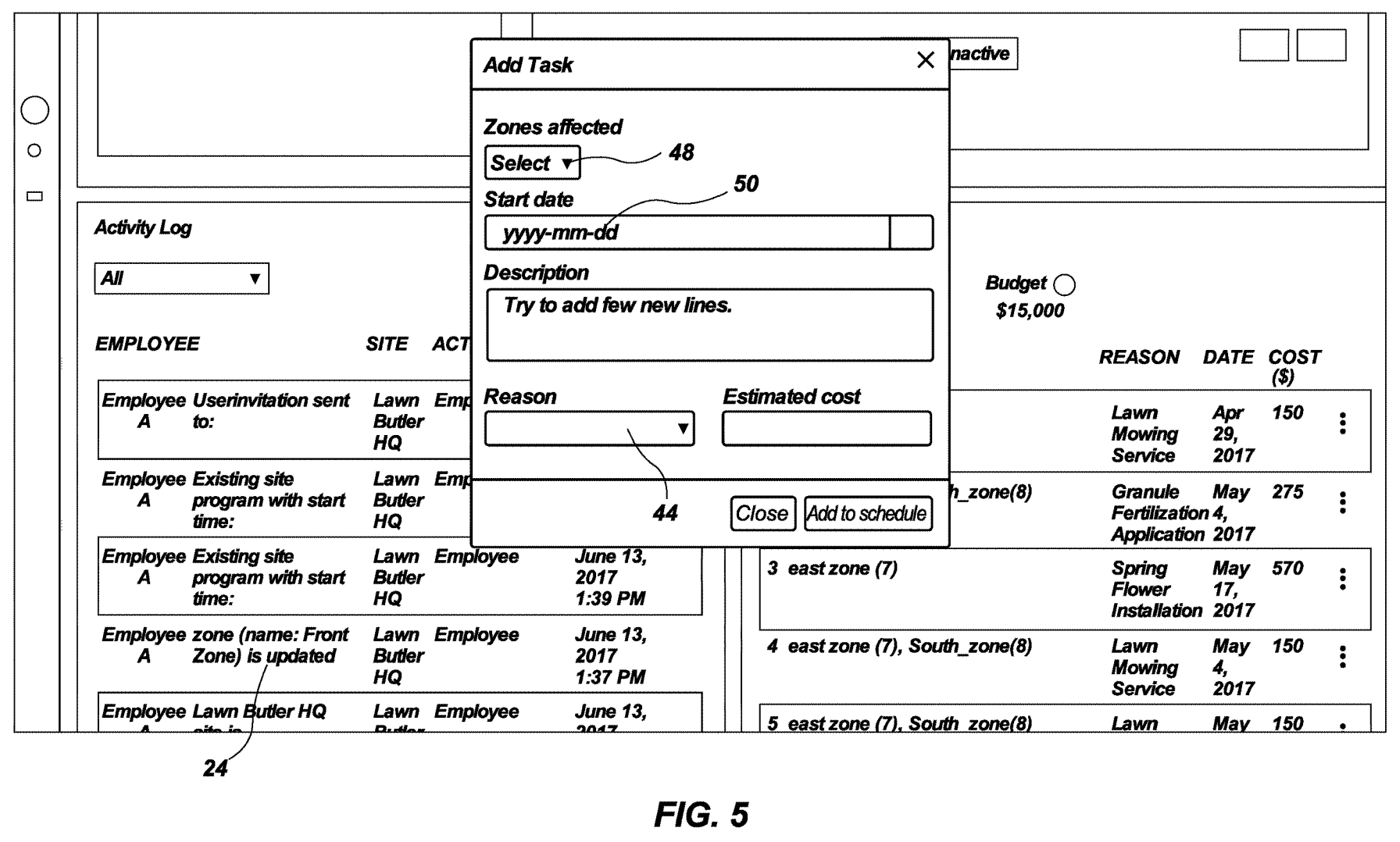

Referring to FIGS. 5-7, tasks may be predetermined and scheduled within the processor 14 such that a user can manipulate the user interface in a manner as easily shown in FIGS. 5 and 6. Referring to FIG. 5, a user may provide dates and times 48 as well as zones affected 50 (from a drop down menu or manually entered) in addition to the reason or task menu 44. The task menu 44 may be the only input utilized and then "added to schedule" 52 by a mouse click or double click or finger swipe or other means in the art for signaling the processor from a mobile or computer device.

Referring to FIG. 7, a user may manipulate the landscape events or create new events that may be retained in the memory 42 of the processor 14 or may create a one-time landscape event that is not retained in the memory 42. A user may "add a task" to the watering management system 10 by entering in a description 54 as well as a schedule 56. The schedule 56 may be one time, recurring or whatever the user enters into the system 10. A user may also, for the owner's benefit, provide a cost 58 that may be associated with the owner's utilization of the system for monitoring and tracking water usage as well as landscape events. A user may further enter zones affected 60 and or controllers affected and then the user sends a signal to the processor by "add to schedule" 62 which is easily entered by a mouse click or double click or finger swipe or other means in the art for signaling the processor from a mobile device or computer device.

It will be appreciated that each watering system 16, 18, 20 may include a controller, a plurality of controllers as well as a plurality of irrigation sprinklers which may include drip lines, large sprinklers, small sprinklers, mist systems or the like. In certain embodiments, the irrigation manager, owner, landscaper or other authorized users may make changes to the tasks and the watering management system 10. The system may also provide for a user to input pictures or a change in the landscape into the system 10. In the event of a change in landscape into the system the user can input the landscape, similar to how the user input the landscape event, to provide adjusting watering times and durations based on the new landscape. In this instance after the landscape event is complete the processor 14 may be notified of the change of landscape and provide and output 36 to the controller for that portion of the landscape and those the watering information may not revert to the previously scheduled times and durations (i.e. previous watering schedule) because of the changes in landscape.

Although the foregoing description contains many specifics, these should not be construed as limiting the scope of the invention or of any of the appended claims, but merely as providing information pertinent to some specific embodiments that may fall within the scopes of the invention and the appended claims. Features from different embodiments may be employed in combination. In addition, other embodiments of the invention may also be devised which lie within the scopes of the invention and the appended claims. The scope of the invention is, therefore, indicated and limited only by the appended claims and their legal equivalents. All additions, deletions and modifications to the invention, as disclosed herein, that fall within the meaning and scopes of the claims are to be embraced by the claims.

What is claimed:

1. A system for altering a watering system based on a landscape event, the system comprising:
    an irrigation manager interface on a first remote device, the irrigation manager interface comprising a task menu for an irrigation manager user to input one or more customized landscape tasks, the one or more customized tasks including a type of landscape event and one or more zones affected;
    a user interface to receive input from the user, the user interface operable on a second remote device, and wherein the user interface comprises a plurality of selections including:
        a plurality of predetermined landscape events, the plurality of predetermined landscape events including at least one of lawn mowing service, fertilization application, sod installation, shrub installation, tree installation, and flower installation;
        the one or more customized landscape tasks; and
        a date of the landscape event;
    a processor programmed with the plurality of predetermined landscape events and customized landscape tasks, each of the plurality of predetermined landscape events and customized landscape tasks comprising a predetermined duration to water or not water a landscape based on the type of the predetermined landscape event, the processor configured to:
    receive a signal from the first remote device for the type of the predetermined landscape event or customized landscape task, the date of the landscape event or customized landscape task;
    process the predetermined landscape event or customized landscape task, wherein the type of landscape event comprises the predetermined duration to water or not water the landscape;
    signal a controller to alter a watering schedule based on the type of landscape event and the date of the landscape event;
    receive a signal of completion of the landscape event after the predetermined duration to water or not water the landscape;
    process the signal of completion; and
    signal the controller that the landscape event is completed after the predetermined duration of the landscape event; and
    the controller connected to the processor configured to receive signals from the processor; wherein the controller controls an application of water for a specified location.

2. The system of claim 1, wherein the processor provides the signal to alter the watering schedule to a plurality of controllers.

3. The system of claim 1, wherein the interface presents to the user an estimated cost of watering for each of the plurality of predetermined landscape events.

4. The system of claim 1, wherein the processor is configured to:
signal the controller after a pre-determined period of time based on the landscape event;
process a signal of a duration of the landscape event; and
signal the controller to revert to an original watering schedule.

5. The system of claim 1, wherein the processor is configured to:
signal a user with a notification to a user's device after selecting the landscape event.

6. The system of claim 1, wherein the processor is configured to:
signal a user with a notification to a user's device after the completion of the landscape event.

7. The system of claim 1, wherein the processor is configured to:
receive a signal of at least one change to the predetermined landscape events;
process the at least one change; and
signal the controller the at least one change to the predetermined landscape events.

8. The system of claim 4, wherein the processor is configured to:
receive a signal of at least one change to the predetermined landscape events;
process the at least one change; and
signal the controller the at least one change to the predetermined landscape events.

9. The system of claim 1, wherein the processor is configured to:
receive new inputs of new landscape events not previously determined, the new inputs comprising predetermined durations of the new landscape events; and
signal to the controller the new inputs of the new landscape events.

10. The system of claim 9, wherein the processor is configured to:
receive a signal of a change in landscape;
process the change in landscape; and
signal the controller to adjust the watering schedule based on a change in landscape.

11. The system of claim 1, wherein the processor is configured to:
receive a signal of a new landscape based on the landscape; and
process the new landscape based on a predetermined watering schedule; and
signal the controller to adjust the watering schedule based on the new landscape.

12. The system of claim 1 comprising:
at least one of a computer, a tablet, a laptop, a smartphone or a smartwatch; and
the user interface, wherein the user interface presents the plurality of predetermined landscape events to the user, the plurality of predetermined landscape events comprising sod installation, shrub installation, tree installation, flower installation, lawn mowing service, and fertilizer application; and
wherein the user interface further presents an estimated cost of watering for each of the plurality of predetermined landscape events.

13. The system of claim 1, wherein the processor is configured to signal the at least one controller to revert to an original watering schedule.

14. A system for adjusting a watering system, the system comprising:
an irrigation manager interface on a first remote device, the irrigation manager interface comprising a task menu for an irrigation manager user to input one or more customized landscape tasks, the one or more customized tasks including a type of landscape event and one or more zones affected;
at least one processor programmed with predetermined landscape events, and at least one user interface on a second remote device in communication with the at least one processor, the at least one user interface comprising means for a user to select a landscape event type, a date, a time, and the one or more customized landscape tasks, and wherein the at least one processor is configured to:
receive a landscape event type signal from the user interface, the landscape event type signal comprising a landscape event or the one or more customized landscape tasks, and a duration of time to water or not water a landscape;
receive a date signal from the user interface;
receive a time signal from the user interface;
process the landscape event type signal, the date signal, and the time signal;
signal at least one controller to adjust a watering schedule based on the landscape event type signal, the date signal, and the time signal;
receive a signal of completion of the landscape event based on a predetermined duration of the landscape event;
process a signal of the predetermined duration of the landscape event; and
signal the at least one controller that the landscape event is completed based on the predetermined duration; and
the at least one controller connected to the at least one processor, the at least one controller configured to receive signals from the at least one processor; wherein the at least one controller controls an application of water for a specified location.

15. The system of claim 14 wherein the at least one processor comprises a plurality of processors; and the at least one controller comprises a plurality of controllers.

16. The system of claim 15, wherein the at least one processor provides signals to a plurality of controllers.

17. The system of claim 16, wherein the plurality of controllers react to a command provided by the at least one processor based on the landscape event.

18. The system of claim 16, wherein the at least one processor is configured to:
receive new inputs of new landscape events not previously determined, the new inputs comprising predetermined durations of the new landscape events; and
signal the controller the new inputs of the new landscape events.

19. The system of claim 14, wherein the user interface presents to the user an estimated cost of watering for each of the predetermined landscape events, and wherein the estimated cost of watering comprises a difference between a cost of water used for the original watering plan and a cost of water used for the predetermined landscape event.

20. A system for adjusting a watering system, the system comprising:

a first irrigation manager interface comprising a menu for an irrigation manager user to input a customized landscape task, the customized landscape task comprising a landscape event and an area of land affected by the landscape event;

a processor in communication with the first irrigation manager interface and a second user interface, the processor programmed with a plurality of predetermined landscape events, and the customized landscape task from the first irrigation manager interface;

the second user interface comprising means for a user to select: a predetermined landscape event from the plurality of predetermined landscape events or the customized landscape task, a date, and a time; and wherein the processor is configured to:

receive a landscape event type signal from the second user interface, the landscape event type signal comprising the predetermined landscape event or the customized landscape task;

receive a date signal from the user interface;

receive a time signal from the user interface;

process the landscape event type signal, the date signal, and the time signal;

signal at least one controller to adjust a watering schedule based on the landscape event type signal, the date signal, and the time signal;

receive a signal of completion of the landscape event based on a predetermined duration of the landscape event;

process a signal of the predetermined duration of the landscape event; and signal the at least one controller that the landscape event is completed based on the predetermined duration; and the at least one controller connected to the processor, the at least one controller configured to receive signals from the processor; wherein the at least one controller controls an application of water for a specified location.

* * * * *